United States Patent
Conley et al.

(10) Patent No.: US 10,214,323 B2
(45) Date of Patent: *Feb. 26, 2019

(54) CAP ASSEMBLY HAVING INSIDE SEAL

(71) Applicant: DSG TECHNOLOGY LLC, Dayton, OH (US)

(72) Inventors: Dale Conley, Bellbrook, OH (US); Mark Broerman, Kettering, OH (US)

(73) Assignee: DSG TECHNOLOGY LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/793,017

(22) Filed: Oct. 25, 2017

(65) Prior Publication Data
US 2018/0044071 A1    Feb. 15, 2018

Related U.S. Application Data

(63) Continuation of application No. 15/487,976, filed on Apr. 14, 2017, now Pat. No. 9,821,931, which is a (Continued)

(51) Int. Cl.
| | |
|---|---|
| *B65D 41/04* | (2006.01) |
| *B29C 70/80* | (2006.01) |
| *B65D 1/16* | (2006.01) |
| *B65D 1/20* | (2006.01) |
| *B65D 81/20* | (2006.01) |

(Continued)

(52) U.S. Cl.
CPC .......... *B65D 41/0442* (2013.01); *B29C 70/80* (2013.01); *B65D 1/165* (2013.01); *B65D 1/20* (2013.01); *B65D 41/045* (2013.01); *B65D 41/0471* (2013.01); *B65D 41/348* (2013.01); *B65D 53/04* (2013.01);

(Continued)

(58) Field of Classification Search
CPC ...... B65D 41/0442; B65D 1/165; B65D 1/20; B65D 81/2015; B65D 41/0471; B29C 70/80; B29K 2705/00; B29L 2031/565
USPC .................... 215/44, 45, 252, 329, 341, 343
See application file for complete search history.

(56) References Cited

U.S. PATENT DOCUMENTS

| | | |
|---|---|---|
| 888,818 A | 5/1908 | Karrmann |
| 1,972,280 A | 9/1934 | Von Till |

(Continued)

FOREIGN PATENT DOCUMENTS

WO    WO 2010/099566 A1    9/2010

OTHER PUBLICATIONS

PCT/US2015/050491, International Search Report and Written Opinion, dated Jan. 7, 2016.

(Continued)

*Primary Examiner* — James N Smalley
(74) *Attorney, Agent, or Firm* — Fay Sharpe LLP

(57) ABSTRACT

A seal and method of forming a seal for a resealable container includes a removable cap that is selectively received over a pour opening formed in a can body. A seal is adhered to the end wall of the cap and includes a continuous, first axial region extending outwardly from the inner surface of the cap. The seal first region is dimensioned for engagement with the opening in the container and sealing the container along an inner diameter thereof. Reduced on-torque/off-torque are required since the seal is formed on the inner diameter, and a down force is substantially reduced to assemble the cap to the container.

21 Claims, 9 Drawing Sheets

Related U.S. Application Data continuation of application No. 15/146,658, filed on May 4, 2016, now Pat. No. 9,676,524, which is a continuation of application No. PCT/US2015/050491, filed on Sep. 16, 2015.

(60) Provisional application No. 62/051,213, filed on Sep. 16, 2014, provisional application No. 62/136,847, filed on Mar. 23, 2015.

(51) Int. Cl.
*B65D 41/34* (2006.01)
*B65D 53/04* (2006.01)
*B29K 705/00* (2006.01)
*B29L 31/56* (2006.01)

(52) U.S. Cl.
CPC ..... *B65D 81/2015* (2013.01); *B65D 81/2053* (2013.01); *B29K 2705/00* (2013.01); *B29L 2031/565* (2013.01)

(56) References Cited

U.S. PATENT DOCUMENTS

| | | |
|---|---|---|
| 3,155,262 A | 11/1964 | Cros |
| 3,411,649 A | 11/1968 | Mumford |
| 3,450,291 A | 6/1969 | Lovell |
| 4,340,149 A | 7/1982 | Mori et al. |
| 5,622,280 A | 4/1997 | Mays et al. |
| 6,015,062 A | 1/2000 | Bachmann et al. |
| 2006/0011633 A1 | 1/2006 | Cook et al. |
| 2006/0169665 A1 | 8/2006 | Matukawa et al. |
| 2009/0178995 A1 | 7/2009 | Tung et al. |
| 2011/0278255 A1 | 11/2011 | Forrest et al. |
| 2013/0056436 A1 | 3/2013 | Muto et al. |

OTHER PUBLICATIONS

EP Application No. 15 842 003.4 Supplementary European Search Report, dated Mar. 21, 2018.

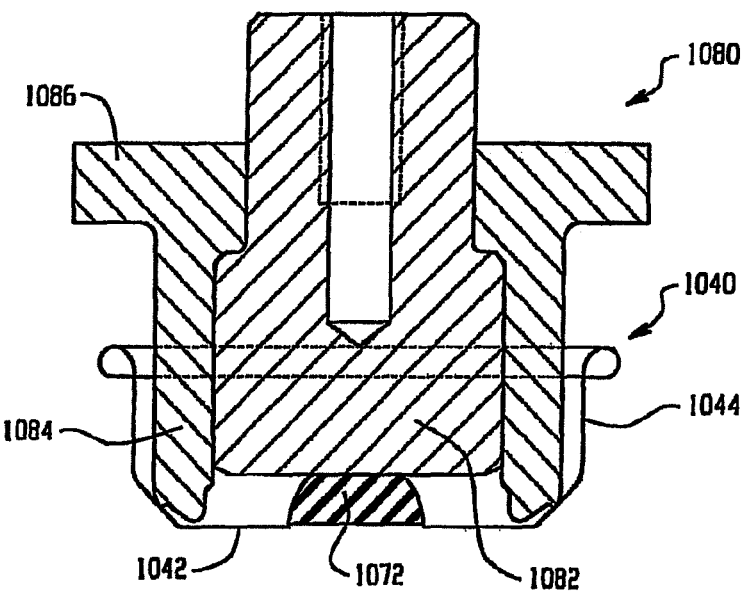
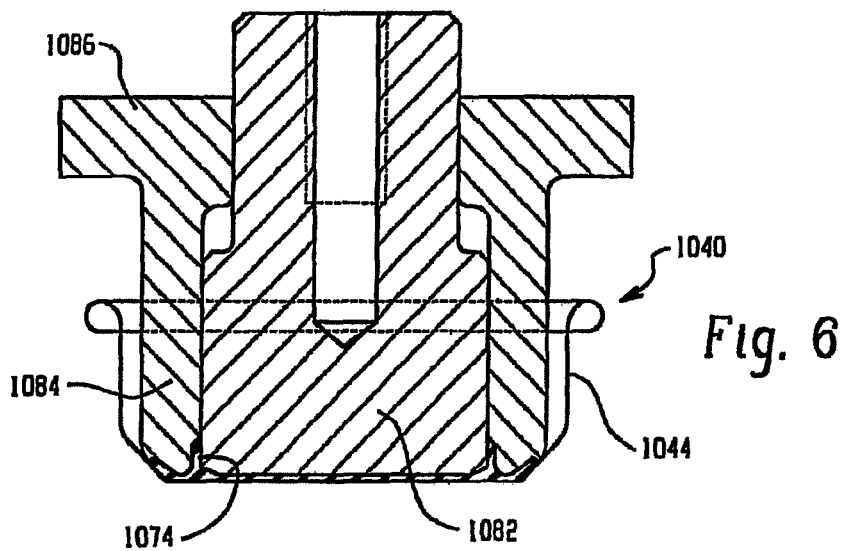
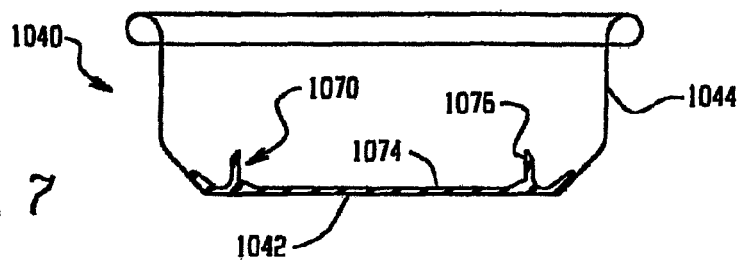

CAP ASSEMBLY HAVING INSIDE SEAL

This application claims the priority benefit of U.S. application Ser. No. 15/487,976, filed Apr. 14, 2017, which is a continuation of U.S. application Ser. No. 15/146,658, filed on May 4, 2016 claiming the prior benefit of international application PCT/US2015/050491, filed Sep. 16, 2015, U.S. provisional application Ser. Nos. 62/051,213, filed Sep. 16, 2014 and 62/136,847, filed Mar. 23, 2015, the entirety of each of the disclosures of which are expressly incorporated herein by reference.

BACKGROUND

The present disclosure relates to containers or cans of a wide variety of sizes, volume, etc., and more particularly to a cap assembly used with a reclosable container. Use of these types of reclosable containers may find application in the food and beverage industry, or with still other fluid products.

In certain industries, it is known to use a seal received on an inner surface of a threaded cap where the seal is compressed along an angular, circumferential surface of the container. For example, a compressible disk type seal is typically inserted on the inner surface of the cap. The seal is not adhered to the cap. Thread position is important for correct compression of the seal. Likewise, correct compression is important for on-torque, as well as for holding pressure in the container. As a result, pressure retention and on/off torque are directly related to the compression of the seal.

In the past, a top load or down force was required to flatten out the seal. This force could range as high as 250 to 400 pounds of down force particularly when dealing with sealing pressurized containers (e.g., fluid contents such as carbonated beverages under a typical pressure of about 90 psi for aluminum and approximately 175 psi or greater for a glass container). The seal was required to be compressed and was smashed on to form a so-called roll on pilfer proof (ROPP) seal. Once the down force was applied, then the cap was crimped to complete the cap and container assembly.

It would be advantageous to reduce the down force and on-torque required to seal the cap to the container. It would be further advantageous to eliminate the need for requiring a top seal, or a side seal between the cap and container.

Thus, a need exists for a twist-on/twist-off cap that can be used with a reclosable container in a pressurized or carbonated environment that substantially reduces the downward force and on-torque required to provide an effective seal.

SUMMARY

A reclosable container assembly includes a container closed at a first end. The container has an open, second end through which an associated fluid is introduced into and poured from the container. A metal, cup-shaped cap has an end wall and a perimeter sidewall extending therefrom. The cap is dimensioned for receipt on the container to selectively close the second end of the container. A seal includes a continuous, first axial region extending outwardly from the inner surface of the cap. The seal first region is dimensioned for engagement with the opening in the container and sealing the container along an inner diameter thereof.

The seal is adhered to the inner surface of the end wall of the cap,

The container includes a curl at the second end that forms an innermost diameter of the container second end.

The first region of the seal includes a lip that extends inwardly into the container second end an axial dimension beyond the innermost diameter of the container second end.

The seal first region deforms in response to internal pressure in the container to urge the seal first region to conform radially outward along the curvilinear contour at a location inward of the innermost diameter of the container second end.

The seal includes a second region adjacent an interface of the first region with the end wall of the cap that is not required for sealing purposes but is advantageously used to exert a drag force between the cap and container.

The cap and container include cooperating lugs and thread lug portions for selectively opening and closing the container.

One embodiment of forming a seal in a metal cap that closes an opening of a resealable container includes placing a predetermined amount of fluid seal material on an inner surface of the cap. A tool is advanced and forms a perimeter seal with the inner surface of the cap around the fluid seal material and engages the fluid seal material. The tool forms a desired profile of the seal material on the inner surface of the metal cap.

The placing step includes extruding melted, fluid seal material on the inner surface of the cap.

The tool sealing step with the inner surface of the cap occurs by engaging the cap inner surface around the perimeter of the deposited seal material.

The forming step includes sizing a portion of the profiled seal to engage the metal container opening along an inner diameter thereof.

The seal material is cold formed by the tool to define the final profile of the seal.

The cap is pre-heated prior to introducing the seal material into the cap.

The seal provides for pressure retention independent of the on/off-torque.

An inner diameter seal is beneficially created between the cap and container opening.

Another advantage of the present disclosure is associated with caps having formed seals where the caps are twisted on pressurized products such as carbonated beverages during the filling process, in contrast to conventional cap seals for carbonated product that are compressed on using crowns or ROPP.

Still another advantage resides in the ability to use seal material between the cap and upper surface of the container to control a desired drag or force during assembly.

The container and cap assembly is easy to manufacture, repeatable, effective, inexpensive, and usable in a wide array of environments (e.g., pressure, vacuum, steel cap, aluminum cap, thermal extremes, thermal cycling, etc.).

Benefits and advantages of the present disclosure will become more apparent from reading and understanding the following detailed description.

BRIEF DESCRIPTION OF THE DRAWINGS

FIG. 5 illustrates initial advancement of a tool into the cap.

FIG. 6 shows a cold forming of the seal material on the inner face of the cap.

FIG. 7 shows the final seal profile formed in the cap.

DETAILED DESCRIPTION

Turning to FIGS. 1-11, this seal arrangement finds particular application in a resealable container assembly 1000 (FIG. 1) of the type that includes a metal container 1002 closed at a first or lower end 1004, and having a sidewall 1006 that connects with a first or upper end 1008 that has an opening 1010. The opening 1010 receives an associated fluid therethrough, i.e., the fluid is introduced into and poured from the container 1002 through the opening. More particularly, the opening 1010 is located in a reduced diameter region sometimes referred to as a dome that has neck 1020 formed in the metal container 1002. Thus, in this embodiment the sidewall 1006 of the container 1002 is typically significantly larger in diameter than the opening 1010 in the neck 1020. As shown, the opening 1010 is formed by a curl 1030 (FIG. 2) shown here as a curl that preferably curves radially outward about 360 degrees, although it will be understood that the curl could also curl inwardly.

A metal cup-shaped cap 1040 has an end wall 1042, and a perimeter sidewall 1044 extending from the end wall. An inner surface or product side 1046 of the cap end wall 1042 is selectively received over the opening 1010 in the container 1002. Lugs 1050 are provided on the cap at spaced perimeter locations of the sidewall 1044, and cooperate with thread portions 1060 formed in the dome 1020 of the container. When fully engaged, the thread portions 1060 are engaged by the cap lugs 1050 in a manner well known in the industry and retain the cap 1040 on the container 1002 to seal the opening 1010 in the upper end of the container. This assembly of the twist-on/twist-off cap 1040 and container 1002 assembly is in contrast to those container assemblies such as oriented polypropylene assemblies, also referred to as ROPP assemblies, where an unthreaded cap is axially advanced over or received on to the container (not twisted on), and the cap threads and container threads are simultaneously formed in a stamping operation or the threads simultaneously rolled on/off the cap and container.

Figure 4:
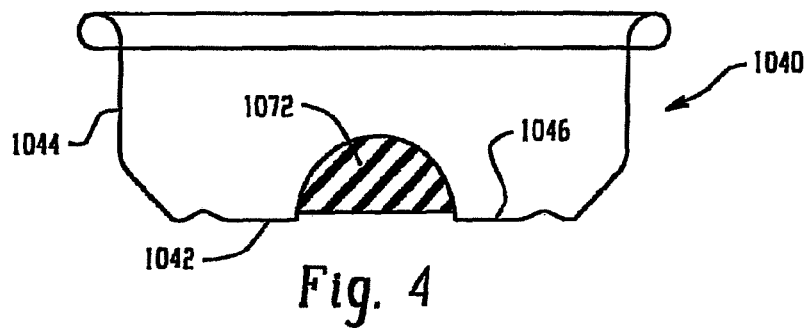
FIG. 4 shows the cap of FIG. 3 with the seal material deposited on and inner face of the cap.
Figure 8:
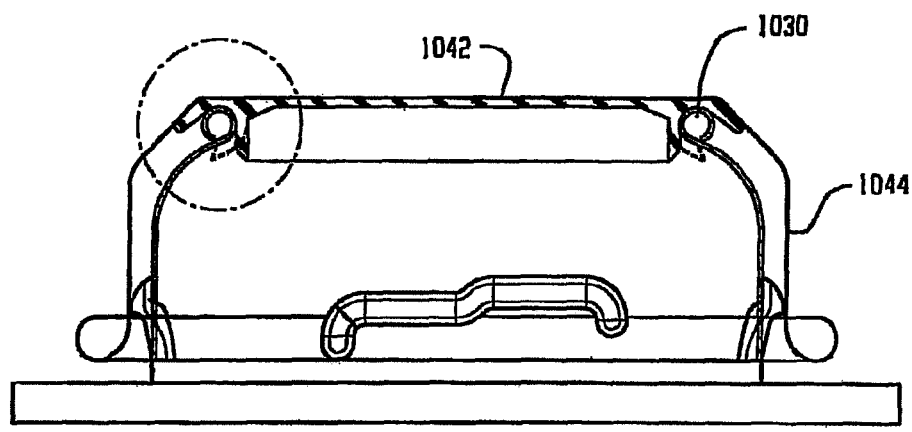
FIG. 8 shows the cap rotated through 180° (closed end facing downwardly) from the orientation of FIG. 7 and into threaded engagement with the thread lugs on the container.

An annular seal 1070 is adhered to the inner surface of end wall 1042 of the metal cap 1040. More particularly, the cup-shaped metal cap 1040 is typically inverted (FIG. 3) and the cap heated to raise the temperature of the cap to a level above ambient temperature and aid in adhering the seal material to the cap. For example, the cap may be inductively heated to raise the temperature of the cap between 240° and 400°, and more preferably in the range of 350°-400°. As represented in FIG. 4, while the cap is at an elevated temperature, a predetermined amount or dollop 1072 of seal material is placed in a central region of the inner surface 1046 of the cap end wall 1042. The seal material may be any of a wide range of materials (typically a polymer) suitable for the food industry where polymer beads, for example, are melted (e.g., around 350°) and then extruded to form the dollop 1072 of seal material on the inner surface 1046 of the heated cap 1040.

A tool assembly 1080 is then introduced into the interior portion of the cap 1040 (FIG. 5). For example, the tool assembly 1080 may be at ambient i.e., significantly below the elevated temperature of the cap and seal material. A first or inner portion (also referred to as an anvil portion) 1082 of the tool assembly 1080 makes initial contact with the dollop 1072 of seal material. The entire tool assembly 1080 continues to advance toward the cap 1040 until an outwardly extending portion (also referred to as a seal form tool or gate) 1084 of the second portion 1086 of the tool assembly 1080 engages the inner wall surface 1046 of the cap 1040. This engagement (for example, at the bottom of the tool stroke) of the seal form portion 1084 of the tool assembly 1080 with the inner wall 1042 of the cap 1040 limits outward migration of the seal material on the inner wall, and the continued advancement of the anvil portion 1082 relative to the seal form portion 1084 and the cap 1040 presses down on the dollop 1072 and spreads the seal material into a thinner, final profile 1074 (FIGS. 6-7). As will be described more fully below in connection with FIG. 10, the tool assembly remains engaged with the seal material for an extended period of time so that the seal material at least partially cures or sets to an extent that the seal retains the desired profile 1074.

Figure 1:
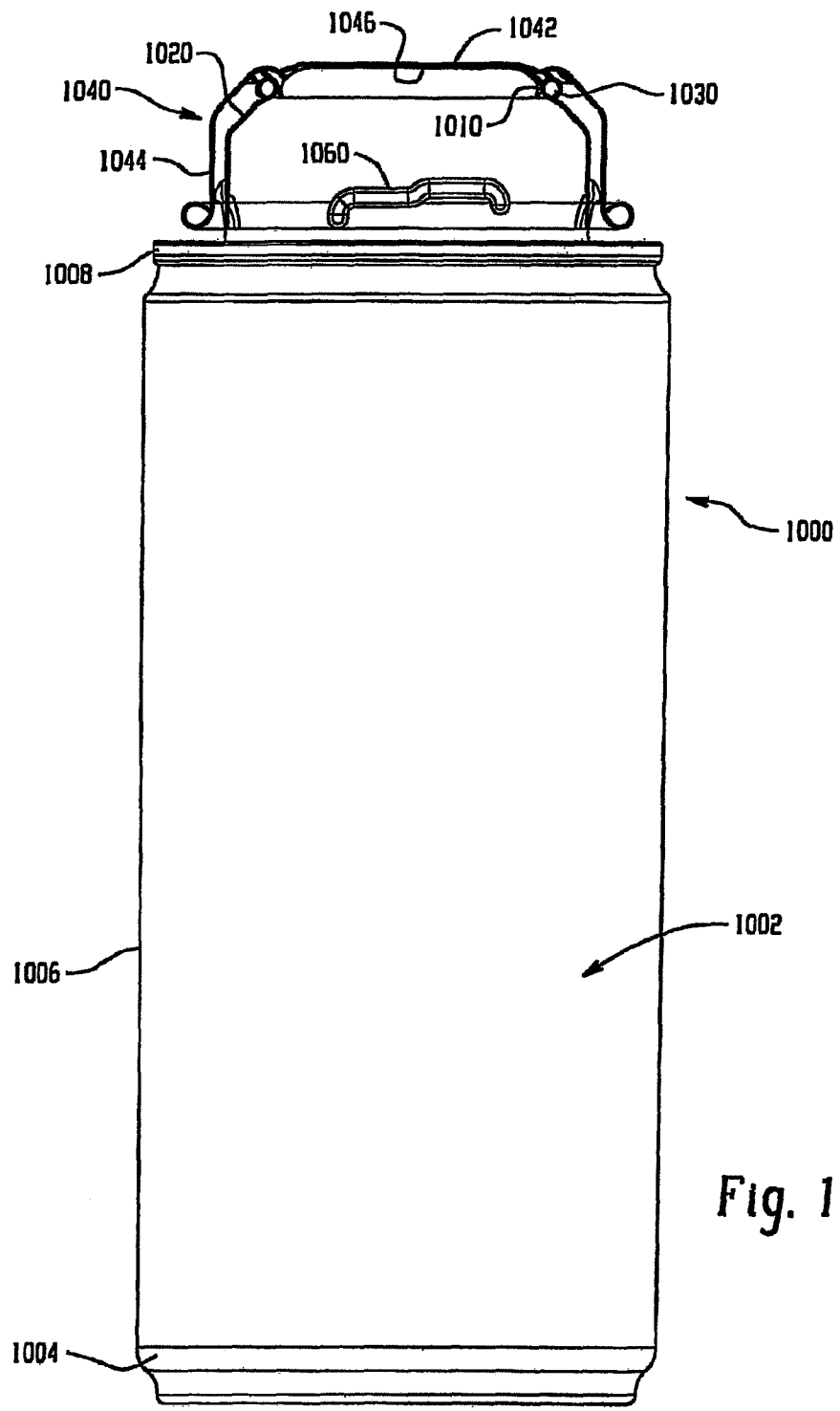
FIG. 1 is an elevational view of a reclosable container having a cap received thereon.
Figure 2:
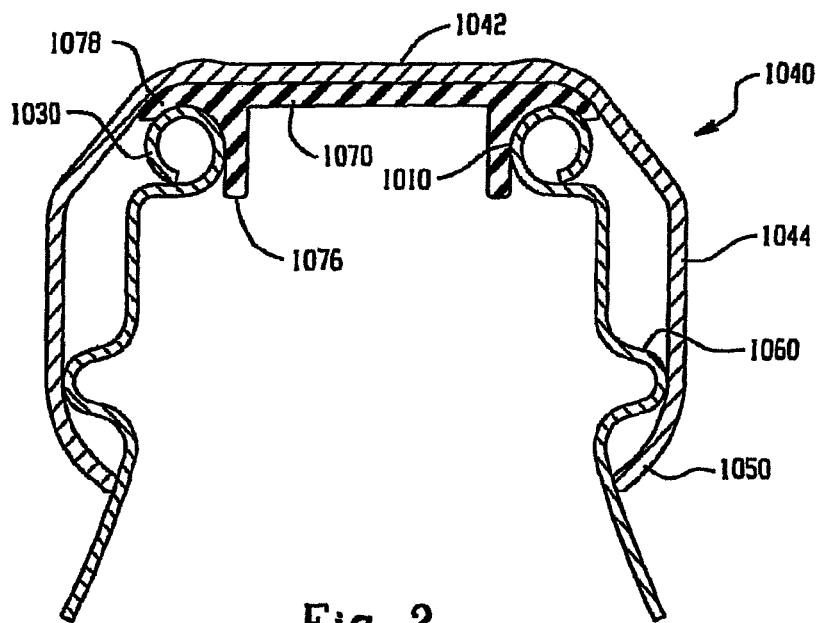
FIG. 2 is an enlarged cross-sectional view through the assembled cap on the container.
Figure 3:
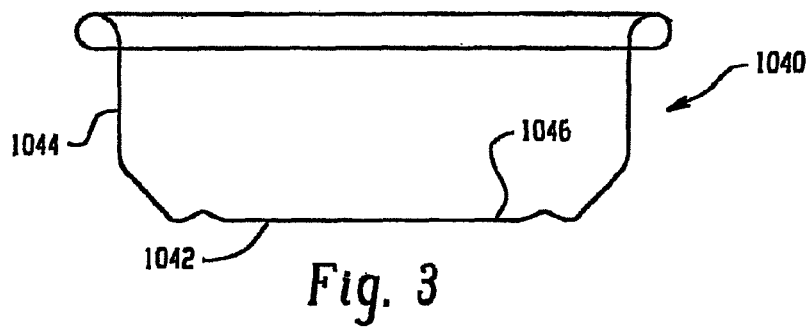
FIG. 3 shows a cross-sectioned cap in an inverted position (closed end facing upwardly).
Figure 9:
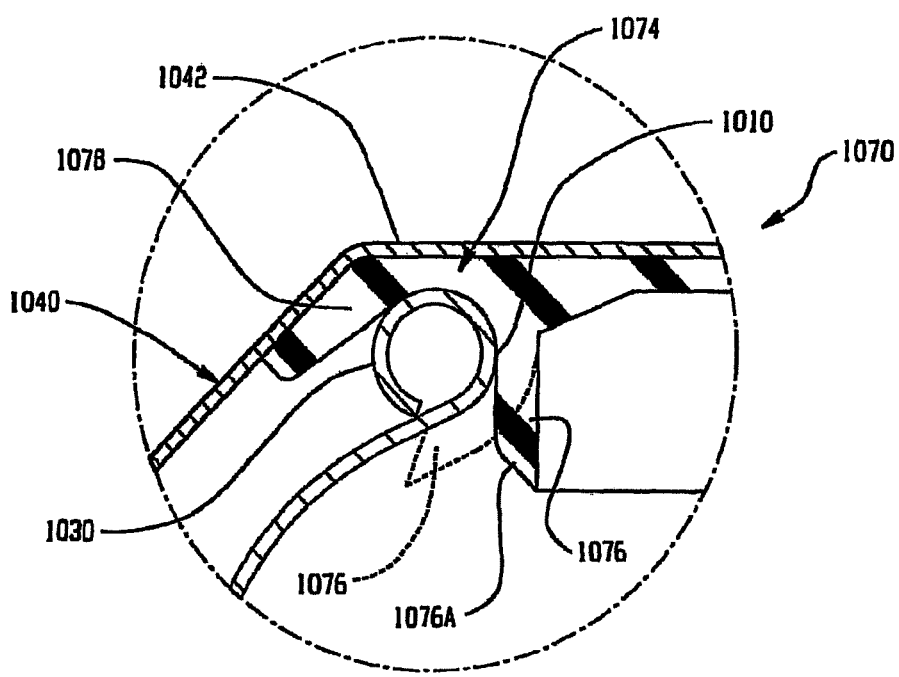
FIG. 9 is an enlarged view showing the sealing engagement between the seal and the inner diameter of the container.

More particularly, the final profile 1074 of seal 1070 includes a circumferentially continuous first region 1076 extending axially outwardly from the inner surface 1046 of the cap 1040 (FIGS. 2 and 7-9). The first region 1076 is dimensioned for engagement within the opening 1010 and thereby seals the container 1002 along the inner diameter (i.e., the innermost diameter) of curl 1030. Particularly, in FIGS. 2 and 7-9, the first region 1076 has an axial dimension that extends from the product side of the cap 1040 beyond the lowermost edge of the curl 1030 so that the first region sealingly conforms to the inner curvature of the curl, extending from along the upper edge of the opening 1010 and continuously to the underside, lowermost region of the curl. Further, the shaping of the container 1002 allows the internal pressure in the container to assist in pressure holding capability. As evident in FIGS. 2 and 7-9, the profile 1074 of the seal 1070 is configured so that in addition to the first region 1076 sealing the inner diameter of the opening 1010 (i.e., the curl 1030), an enlarged, outer shoulder 1078 of the seal engages and seals an upper edge or face of the curl, and also extends radially outward where an angled surface portion of the cap 1040 urges the shoulder 1078 against a radially outer region of the curl. Thus, as shown in FIGS. 2 and 9, the seal 1070 conforms to the curvature of the curl 1030 and is sealed along the curl from interiorly of the innermost diameter of the curl that defines the minimal dimension of opening 1010, and continuously axially and radially outward to an outer portion of the curl (i.e., from approximately 4 o'clock to 10 o'clock as shown in a counterclockwise direction of FIG. 9). FIG. 9 also shows in broken line that when the container and fluid content thereof are pressurized (e.g., carbonated beverages are typically pressurized to around 90 psi for aluminum containers and about 175 psi or greater for glass containers), the pressure urges a terminal end 1076A of the first region 1076 to further conform to the curvature of the curl 1030 interiorly of the innermost diameter of the curl, i.e., the first region wraps along the surface of the curl. Further, the seal material extends over the inner wall 1046 of the cap 1040 at a shoulder region or location 1078 outwardly of the first region 1076. The seal material in this shoulder region 1078 is not necessarily required for sealing purposes (all sealing is accomplished along the inner diameter of the curl) but provides a desired drag or pressure that alters the on/off torque of the cap 1040 relative to the container 1002. That is, the thicker the layer of seal material, the higher the torque required to close and open the cap 1040 on to the container 1002. As a result of controlling the thickness of the seal material layer, the on/off torque can be controlled at least in part. As a result, the present disclosure provides a twist-on/twist-off cap 1040 having a seal liner 1070 that seals along the inner diameter of the opening 1010 to retain contents under pressure (around 90 psi for aluminum or 175+ psi for glass containers), and where the cap can be applied with little on-torque and at a substantially reduced level of down force. The cap 1040 provides an effective, reliable initial seal with the container 1002 to maintain the contents under pressure, as well as re-sealing the container subsequent to opening.

Figure 10:
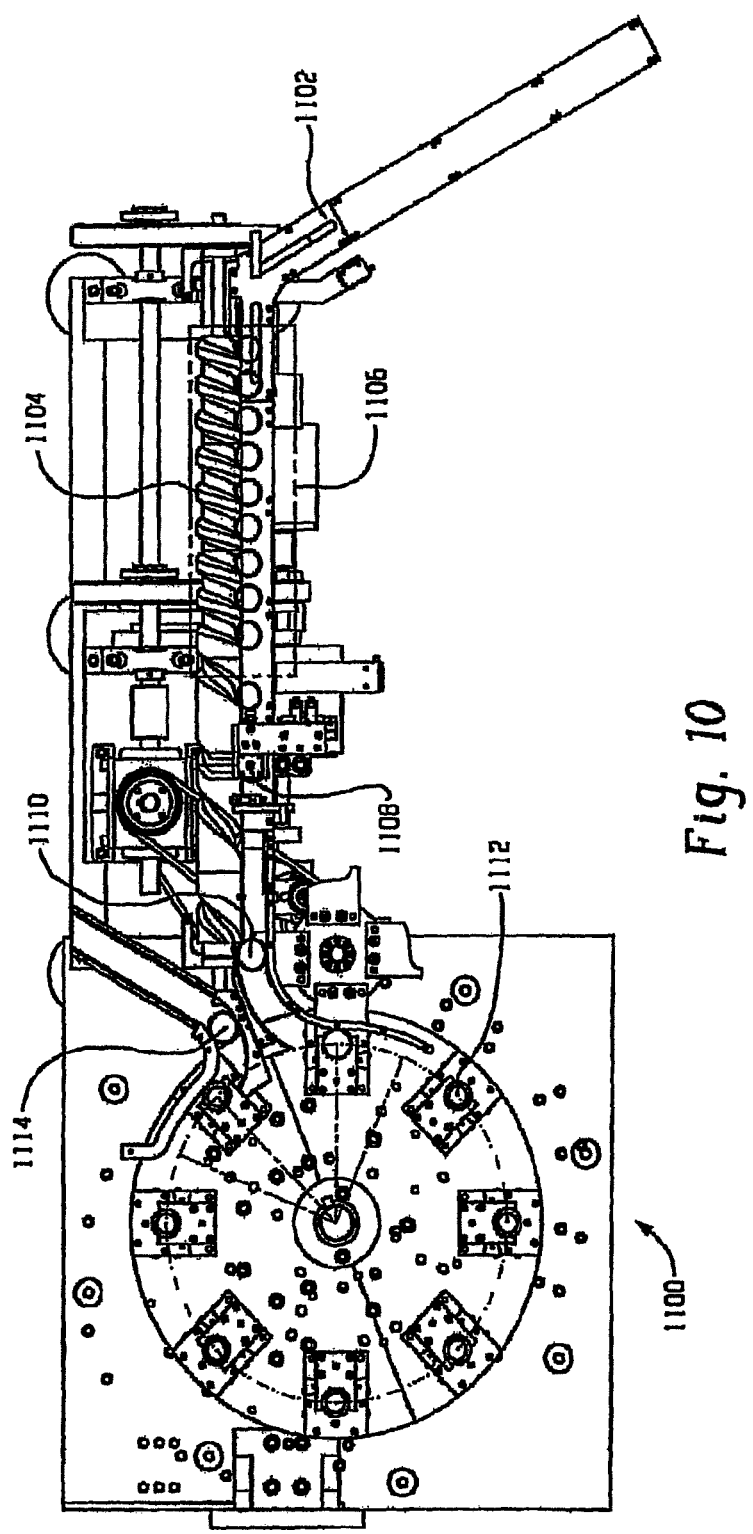
FIG. 10 is an illustration of the introduction of individual caps into a seal forming station.

FIG. 10 shows a seal forming system 1100 for applying the seal to the caps 1040. The caps are introduced in an inverted position (e.g., like FIG. 3) or product side up at ambient cap feed station 1102. A cap feed screw 1104 advances the caps 1040 through a heating zone 1106 and to an extruding gun or nozzle 1108 where the dollop 1072 of seal material is located in the central region of the inner wall 1046 of the cap. At infeed station 1110, the heated individual caps with dollops of seal material applied thereto are introduced into the rotary seal forming head 1112 where the seal forming tool assembly 1080 (FIGS. 5-6) forms the desired seal profile as described above. The rotary motion is shown as advancing in a clockwise direction where the dollop of seal material is formed and the tool assembly 1080 remains engaged with the cap 1040 for an extended period of time, i.e., as an individual cap rotates from approximately 4 o'clock as shown to an outfeed station 1114 where the seal has sufficiently cured to retain the desired final profile once the tool assembly has been removed.

Figure 11:
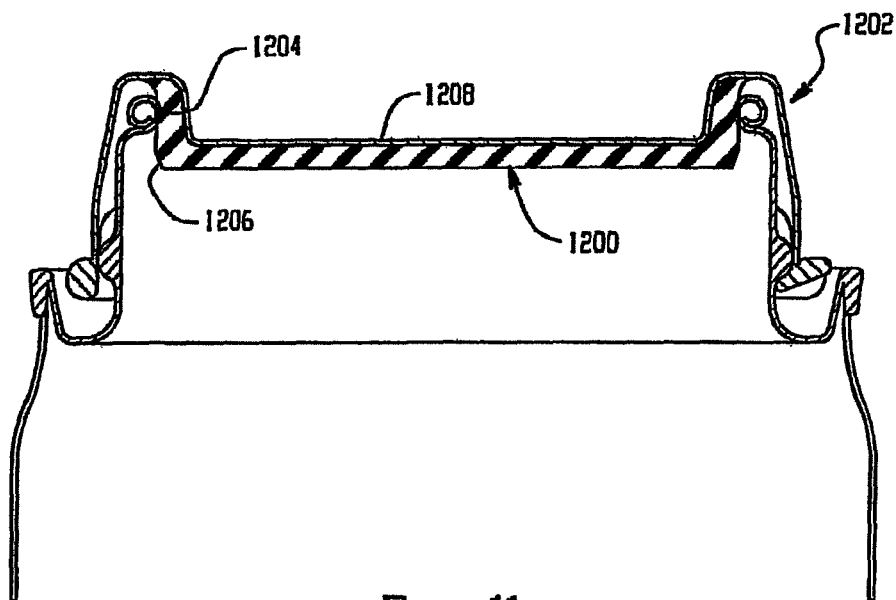
FIG. 11 is an enlarged cross-sectional view of a cap received in sealing engagement with the inner diameter of the container opening.

FIG. 11 is another embodiment of a seal 1200 applied to a modified cap 1202 that seals along the inner diameter 1204 of the curl opening. The axially innermost portion of the seal 1200 has a generally planar conformation with a tapered lead-in edge 1206 along an outer perimeter portion to assist in advancing the cap 1202 into position. A central portion or panel 1208 of the cap 1202 is also recessed or depressed to provide increased strength. Thus, the seal 1200 is still an inside seal much like the previous seal of FIGS. 2-9 except that the cap 1202 is modified to provide the central depressed panel 1208 in the cap 1202 to resist the internal pressure because the opening area is substantially larger. Nevertheless, the arrangement still relies on the inner diameter or side seal for holding pressure. The seal 1200 is radially positioned between the central panel 1208 of the cap and the opening in the container.

The chart below illustrates the versatility of the present disclosure, showing various cap sizes that advantageously achieve an effective seal with the container along the inner diameter opening of the curl as disclosed herein (represented in the second column as the held seal pressure) with a minimum of on-torque (expressed in inch-pounds) required to twist the cap on to the container.

| Cap Diameter | Psi | On-Torque (in-lbs) | Top Load Pressure/Force (lbs) |
|---|---|---|---|
| 28 mm | 100 | 3 and up | <70 |
| 41 | 90 | 3 and up | <70 |
| 52 | 90 | 22* | <70 |

In summary, the container is preferably sealed along the inner diameter interface between the cap seal and a curl on the container. The seal extends from the metal cap and is formed to extend beyond a lowermost part of the curl so that pressure inside of the container can enhance the seal along the "underside" of the inner diameter of the curl. In particular, the metal cap can be twisted on to a container and forms an effective seal (as opposed to being received on a container and the cap being stamped or deformed to create the threaded arrangement between the cap and container). The on-torque is preferably sufficiently low, e.g. 50 inch-pounds or less, and more preferably 3-35 inch-pounds or less for cap diameters ranging from 28 mm to 52 mm (see chart above) while applying the cap. The on-torque value of 22 in-pounds* noted in the above table for the 52 mm cap is deceiving since the 52 mm cap is a different design than either the 28 mm or 41 mm caps with measured on-torques of 3 inch-pounds. More particularly, the tested 52 mm cap resulted in a substantially larger 22 in-pound on-torque because the cap included a recessed central panel (such as modified cap 1202 shown in FIG. 11). The recessed central panel 1208 provides increased strength and also provides a much more rigid support behind the seal 1200 that increases the interference between the seal 1200 and the inner diameter of the associated container. It is well known in the industry that the on-torque maximum (measured in inch-pounds) when applying caps onto jars, cans, etc. is generally calculated to be equal to the diameter of the cap in millimeters divided in half for that diameter, e.g., a 28 mm diameter cap=14 maximum inch-lbs on torque; a 41 mm diameter cap=20.5 maximum inch-lbs on torque; and 52 mm=26 maximum inch-lbs on torque. Thus it will be appreciated that the 3 in-lb torques associated with the 28 mm and 41 mm are a substantial improvement over expected on-torque values which would typically be calculated to be 14 inch-lbs and 20.5 in-lbs, respectively. In some instances, a limited amount of drag torque may be desired to keep the containers from twisting while making the seal with the inner diameter of the container. Thus, the seal material at the top is only used to control the drag force since all sealing between the cap and container occurs at the inner diameter opening of the container. When the cap is tilted relative to the container, it may be possible to vent past the extended length of the seal if so desired. Moreover, the preferred design uses minimal downforce (e.g., less than 100 pounds, and more preferably less than 70 pounds) on the metal cap to achieve a seal with the container without using steam to soften or make the seal more slick.

It is also contemplated that this feature of sealing along the inner diameter interface between the cap seal and the container could find application in connection with ROPP, and thereby result in a substantial reduction in down force used during the ROPP process (e.g., about 100 pounds or less of down force imposed on the cap during the roll on process) and likewise in connection with crown-type caps.

Moreover, the seal is effective at elevated temperatures such as encountered in pasteurization, and the seal is enhanced during the temperature rise and increased pressure as a result of the lip of the seal extending beyond a lowermost part of the container curl to enhance the seal along the underside of the inner diameter of the curl.

Although not necessary for an effective seal for all of the reasons noted above in connection with the inner diameter seal formed with the container curl, the outside 1078 of the cap 1042 (FIG. 9) can also add to the seal and the threads of the cap and container cooperate to apply the desired force that seals in these regions.

Turning to FIGS. 12-18, there are two dimensions "A" and "B" of the profiled seal 2070 that can be selectively altered or changed to determine the amount of pressure being held by the cap 2040 when the cap is received on the container assembly 2000. More specifically, dimension "A" relates to the outer dimension or diameter of the seal 2070, and more specifically relates to that portion of the profiled seal that extends axially into the container opening 2010 and sealingly engages with the inner perimeter of the opening 2010. Increasing or decreasing the dimension A alters the amount of compression and thus determines whether more or less pressure is held by the container 2002 with the cap 2040 in place. If the diameter or A dimension is increased, the holding pressure of the cap is likewise increased. In one example, the diameter was increased by 0.020 inches and resulted in the holding pressure being increased from 135 psi to 200 psi. Of course these dimensions and pressures are representative only.

Alternatively, the B dimension can be changed. For example, shortening the B dimension which represents the dimension of the first region 2076 of the profiled seal protruding from the inner surface of the cap 2040 reduces the amount of pressure that the container can hold. This results because the first region 2076 of the profiled seal 2070 is not long enough to wrap around and underneath the curl of the container opening 2010. Alternatively, lengthening the dimension B generally increases the amount of pressure that the container 2010 can hold.

Figure 17:
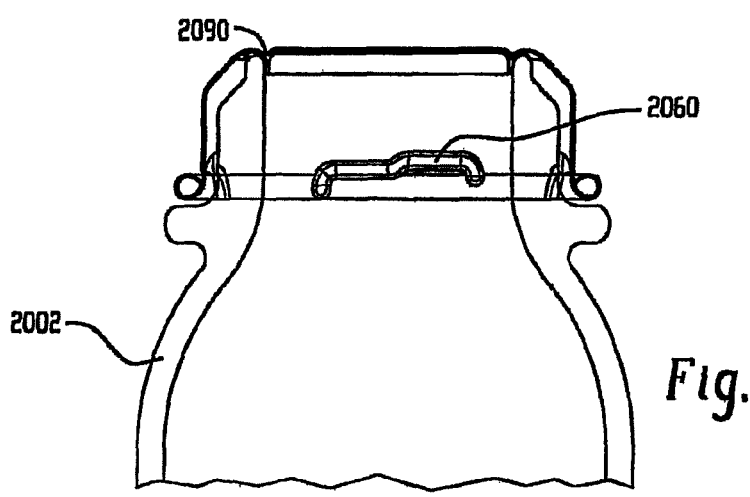
FIG. 17 shows the cap and seal on a glass container.
Figure 18:
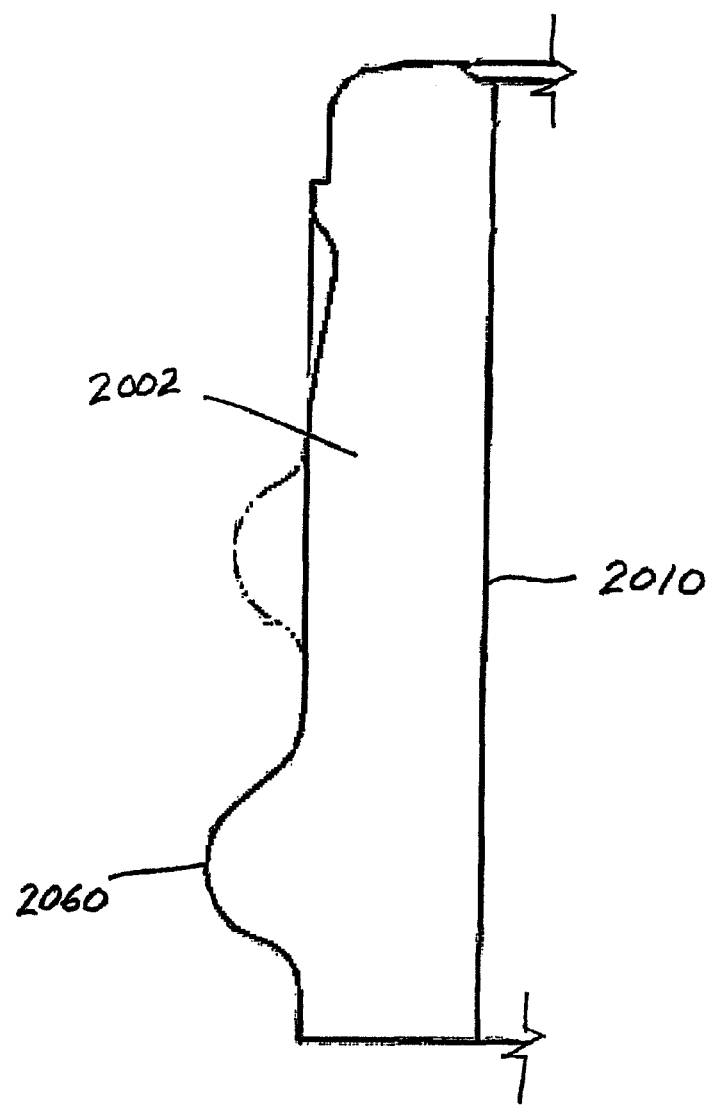
FIG. 18 is an enlarged cross-sectional view of the opening region of a conventional glass container having an external thread portion such as shown in FIG. 17.

It will be appreciated that variations of dimensions A and B can be developed to serve particular needs and/or particular types of containers (e.g., metal or glass containers used with the lugged metal cap). In some instances, for example as shown in the conventionally shaped glass container 2002 of FIG. 18 where the opening 2010 has an extended straight inner wall or a slightly tapering configuration that slowly increases in diameter as it proceeds inwardly from the uppermost edge, the advantages associated with dimension B are still achieved without the axially extending first region 2076 of the profiled seal having a pronounced outward wrap around and underneath a curl of the container opening 2010. Instead, the axially extending first region 2076 of the profiled seal extends and effectively seals along the straight or slightly tapering, inner diameter surface 2010 of the opening of the container 2002. The axially extending first region 2076 of the profiled seal is dimensioned to sealingly engage the opening 2010 of the glass container 2002, yet need not have an extended length that reaches that region of the glass container that has a pronounced outward increase in diameter of the inner wall dimension of the container provided inwardly of the tapered neck opening of the container. Instead, the axially extending first region 2076 of the profiled seal has an axial length as shown in FIGS. 17 and 18 that sealingly engages the opening 2010 of the glass container 2002. This still provides the advantageous benefit of reduced on-torque, and/or the advantageous benefit of a reduced down force, as the thread portions or lugs of the metal cap are threaded on and off the thread portions 2060 of the glass container 2002, and the seal first region 2076 seals the inner diameter 2010 of the glass container 2002.

Figure 13:
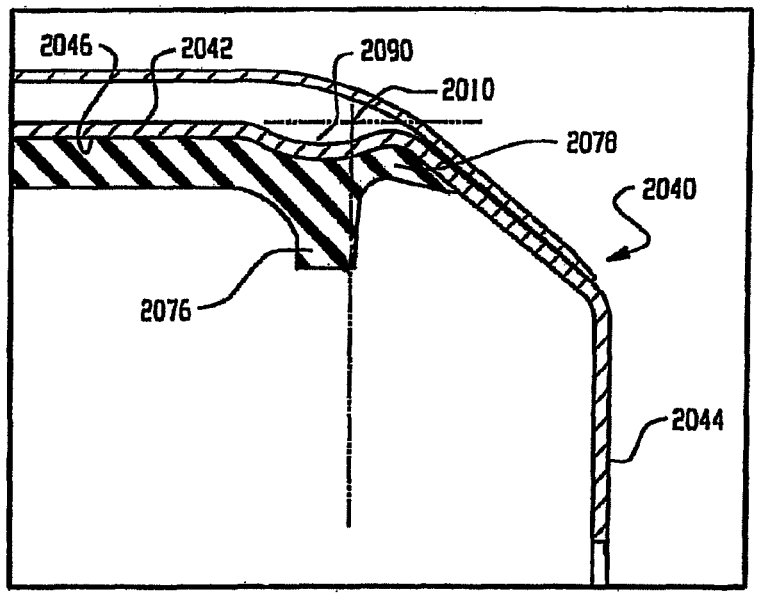
FIG. 13 is an image representing how the seal would engage in inner surface of the container opening under little or no pressure.
Figure 14:
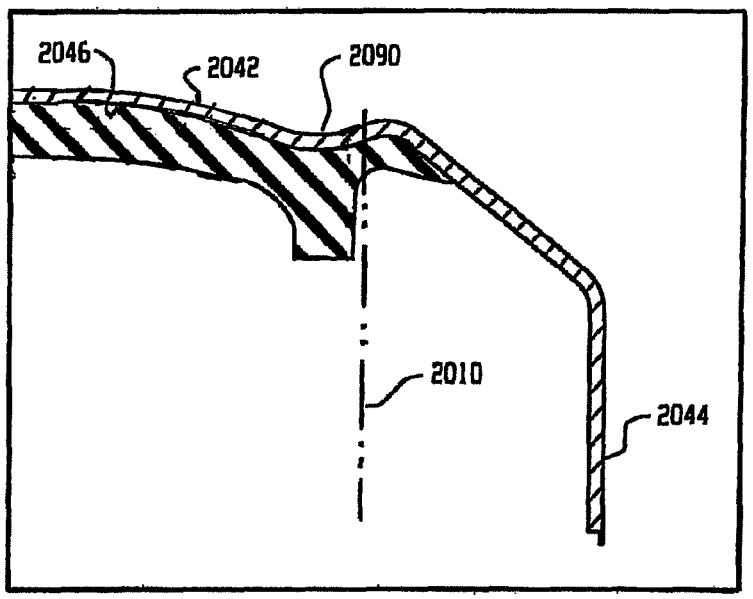
FIG. 14 is an image similar to FIG. 13 where the sealed container has been pressurized to an elevated level and illustrating how the seal would provide venting.
Figure 15:
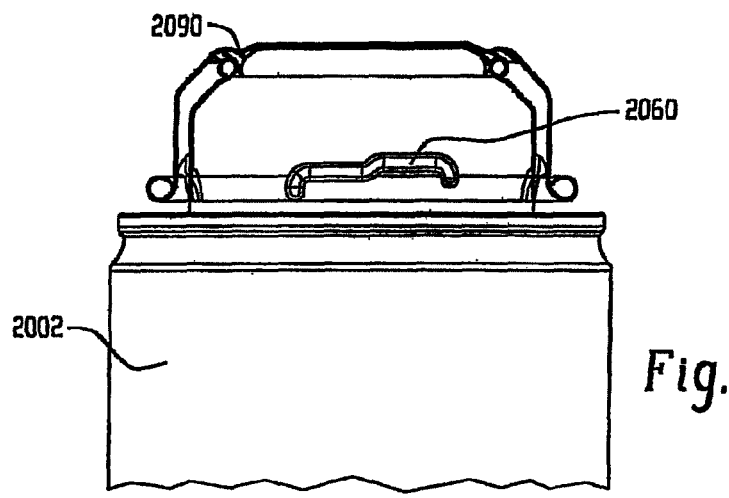
FIG. 15 is an elevational view of a cap having the valley with the profiled seal received on a metal container under little or no pressure.
Figure 16:
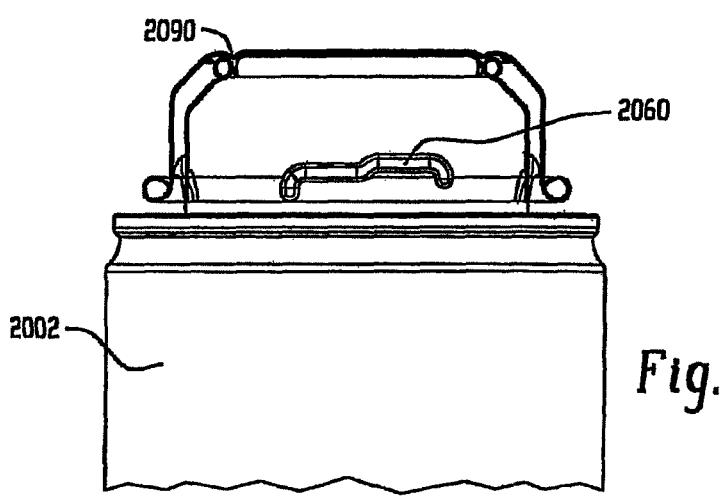
FIG. 16 is an elevational view of a cap having the valley with the profiled seal received on a metal container at an elevated pressure.

A depression, valley, recess, or deformation 2090 is provided in the end wall 2042 of the cap 2040. The depression 2090 is formed in the end wall 2042 at a location spaced inwardly from the sidewall 2044 of the cap 2040. The depression 2090 is preferably circumferentially continuous and generally aligns with the axially extending first region 2076 of the profiled seal. Adding the depression 2090 to the end wall 2042 eliminates variation and provides for a stiffer central panel of the cap end wall. The depression also serves as a pivot when the outer panel rises as a result of increased internal pressure. As a result of this increased pressure and resultant pivoting action, the first region 2076 of the profiled seal 2070 is drawn away from the opening 2010 in the container. That is, increased pressure pushes the end wall 2042 of the cap 2040 outwardly, i.e., upwardly as shown in FIG. 14. The cap 2040 structurally pivots about the depression 2090 whereby the first region 2076 of the profiled seal 2070 moves from sealed engagement as shown in FIG. 13 to a position as shown in FIG. 14 where the increased pressure can vent by the profiled seal. This allows the container to vent. As will be appreciated, the manufacturer would like to control the level at which the container vents. Thus, altering the dimension A determines the maximum pressure that can be held by the cap, for example, approximately 90 psi is desired for metal/aluminum containers and in other instances approximately 175 psi or greater is required for a glass container. Once again, these are representative examples only and should not be deemed to limit the present disclosure. Once the cap 2040 has vented, the pressure decreases in the container. End wall 2042 of the 2040 is no longer pushed outwardly as shown in FIG. 14, and the cap and first region 2076 of the profiled seal 2070 to its original position shown in FIG. 13, and the first region of the profiled seal is still able to re-seal after venting and adopt the position shown in FIG. 9.

Figure 12:
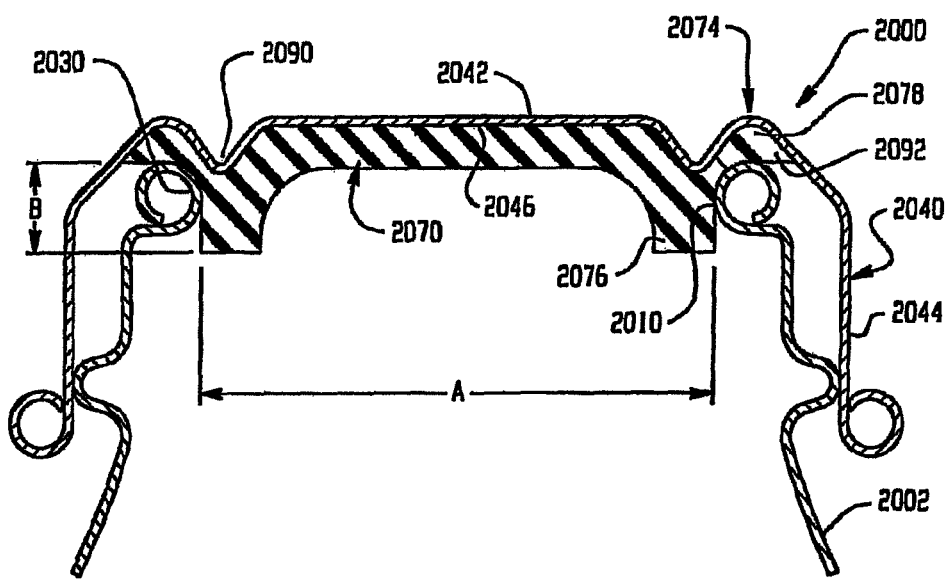
FIG. 12 is an enlarged cross-sectional view of a cap that includes a recess, depression, or valley formed in the cap where the cap is received in sealing engagement with a container.

In some instances, it may also be desirable to remove a portion of the seal material 2070 in the region 2092 (FIG. 12). This removed material in the region 2092 above the apex of the curl of the container that forms the opening 2010 can reduce the on-torque required to assemble the cap 2040 to the container 2002.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

The invention claimed is:

1. A resealable container assembly comprising:
a container that is either metal or glass and closed at a first end so as to be configured for holding an associated fluid at a preselected pressure therein, and having an opening at a second end, the opening having an inner, first diameter through which the associated fluid is introduced into and poured from the container, the container having thread portions adjacent the second end along an external surface thereof;
a metal cup-shaped cap having an end wall, and a perimeter sidewall extending from the end wall, wherein the cap includes roll on pilfer proof (ROPP) thread portions that are formed for selective twist-on/twist-off receipt relative to the thread portions on the container; and
a seal adhered to an inner surface of the end wall of the cap, the seal including a continuous first axial region extending outwardly from the cap inner surface a larger extent than a remainder of the seal, the first axial region of the seal having a radially outer, external surface dimensioned for sealing engagement with a smallest inner diameter of the container opening, such that the external surface of the first axial region seals the container along the smallest inner diameter of the container opening, whereby the seal formed between the first axial region and the smallest inner diameter of the container opening maintains the associated fluid within the container at pressure while holding the cap on the container with less than 100 pounds of down force during formation of the ROPP thread portions.

2. The container assembly of claim 1 wherein the container includes a curl at the second end to form the opening, the curl defining an apex portion of the container opening.

3. The container assembly of claim 2 wherein the seal includes a second, shoulder region adjacent an interface of the first axial region with the end wall of the cap, the shoulder region dimensioned for engagement along the apex portion.

4. The container assembly of claim 3 wherein the engagement of the second shoulder region along the apex portion control and drag forces generated when the cap is moved relative to the container rather than sealing the pressure of the associated fluid within the container, which is performed solely by the seal formed between the first axial region in the smallest inner diameter of the container opening.

5. The container assembly of claim 1 wherein the seal formed between the first axial region and the smallest inner diameter of the container opening maintains the associated fluid within the container at pressure when less than 70 pounds of down force is used during formation of the ROPP thread portions.

6. A resealable container assembly comprising:
a container that is either metal or glass and closed at a first end so as to be configured for holding an associated fluid at a preselected pressure therein, and having an opening at a second end, the opening having an inner, first diameter through which the associated fluid is introduced into and poured from the container, the container having thread portions adjacent the second end along an external surface thereof;
a metal cup-shaped cap having an end wall, and a perimeter sidewall extending from the end wall, wherein the cap includes circumferentially spaced lugs dimensioned for selective twist-on/twist-off receipt relative to the thread portions of the container; and
a seal adhered to an inner surface of the end wall of the cap, the seal including a continuous first axial region extending outwardly from the cap inner surface a larger extent than a remainder of the seal, the first axial region of the seal having a radially outer, external surface dimensioned for sealing engagement with a smallest inner diameter of the container opening such that the external surface of the first axial region seals the container along the smallest inner diameter of the container opening, whereby the seal formed between the first axial region and the smallest inner diameter of the container opening maintains the associated fluid within the container at pressure when the cap is twisted into threaded engagement with the container at a unitless, first numerical value equal to an on-torque maximum numerical value measured in inch-pounds and a second numerical value equal to a numerical diameter of the cap measured in millimeters, wherein the first numerical value less than one-half of the second numerical value.

7. The container assembly of claim 6 wherein the unitless, first numerical on-torque maximum value used when the cap is twisted into threaded engagement with the container is between 3 and is less than one-half the unitless, second numerical value.

8. The container assembly of claim 6 wherein the container includes a curl at the second end to form the portion, the curl defining an apex portion of the container opening, the seal includes a second, shoulder region disposed radially outward of an interface of the first axial region with the inner surface of the end wall of the cap, the shoulder region dimensioned for engagement along the apex portion of the container opening.

9. The container assembly of claim 8, wherein the engagement of the second shoulder region along the apex portion controls drag forces generated when the cap is twisted relative to the container rather than sealing the pressure of the associated fluid within the container, which is preformed solely by the seal formed between the first axial region and the smallest diameter of the container opening.

10. The container assembly of claim 6, wherein the seal formed between the first axial region and the smallest inner diameter of the container opening maintains the associated fluid within the container at pressure when the cap is twisted into threaded engagement with the container with a down force applied of less than 70 pounds.

11. A process of assembling a metal cap and one of a metal or glass container assembly so as to seal an associated fluid therein under pressure, the process comprising:
providing a metal cap;
providing a container having an opening with thread portions;
providing a seal on the metal cap that extends outwardly therefrom for sealing engagement with an innermost diameter of the opening, including (i) providing a continuous first axial region extending outwardly from the cap inner surface a larger extent than a remainder of the seal, and (ii) dimensioning the first axial region of the seal to have a radially outer, external surface dimensioned for sealing engagement with a smallest inner diameter of the container opening;

installing the cap on the container such that the sealing engagement is formed between the first axial region and the smallest inner diameter of the container opening, the sealing engagement configured to hold the associated fluid at a preselected pressure; and forming roll on pilfer proof (ROPP) thread portions on the cap while the cap is held on the container with less than 100 pounds of down force during formation of the ROPP thread portions and the sealing engagement of the first axial region with the smallest inner diameter of the container opening maintains the associated fluid within the container at pressure during the formation of the ROPP thread portions.

12. The process of claim 11 further comprising providing a shoulder region of the seal disposed radially outward of an interface of the first axial region with the inner surface of the end wall of the cap, and dimensioning the shoulder region for engagement along an apex portion of the container opening and terminating adjacent the apex portion and radially inward of an outermost diameter of the second end of the container.

13. The process of claim 11 wherein the seal forming step includes dimensioning the seal to have an axial length that extends axially inward of the curl.

14. The process of claim 11 further comprising placing a dollop of seal material in a central region of an inner surface of the cap;

engaging the cap inner surface with a tool that forms a seal around a perimeter of the dollop of seal material; and providing a desired profile of the seal material on the inner surface of the metal cap.

15. The process of claim 11 further comprising applying the cap to the container with less than 70 pounds of down force to seal the cap to the container while holding the associated fluid within the container under pressure.

16. The process of claim 11 further comprising including a second, shoulder region adjacent an interface of the first axial region with an end wall of the cap, the shoulder region dimensioned for engagement along an apex portion of the container opening, and generating drag forces when the cap is moved relative to the container rather than sealing the pressure of the associated fluid within the container, which is performed solely by the seal formed between the first axial region in the smallest inner diameter of the container opening.

17. A process of assembling a resealable metal cap and one of a metal or glass container assembly that seals an associated fluid therein under pressure comprising:

providing a metal cap having circumferentially spaced lugs;

providing a container having an opening with thread portions that cooperate with the circumferentially spaced lugs of the metal cap for selective twist-on/twist-off receipt of the metal cap relative to the thread portions on the container;

providing a seal on the metal cap that extends outwardly therefrom for sealing engagement with an innermost diameter of the opening, including (i) providing a continuous first axial region extending outwardly from the cap inner surface a larger extent than a remainder of the seal, and (ii) dimensioning the first axial region of the seal to have a radially outer, external surface dimensioned for sealing engagement with a smallest inner diameter of the container opening; and installing the cap on the container such that the sealing engagement is formed between the first axial region and the smallest inner diameter of the container opening, the sealing engagement being configured to hold the associated fluid at a preselected pressure therein with an on-torque maximum value used when the cap is twisted into threaded engagement with the container at a value measured in inch-pounds less than one-half a diameter of the cap measured in millimeters.

18. The process of claim 17 further comprising forming a shoulder region of the seal disposed radially outward of an interface of the first axial region with the inner surface of the end wall of the cap, and dimensioning shoulder region for engagement along an apex portion of the container opening and terminating adjacent the apex portion and radially inward of an outermost diameter of the second end of the container.

19. The process of claim 17 further comprising twisting the cap on to the container with an on-torque maximum value measured at a value between 3 inch-pounds and less than one-half the diameter of the cap measured in millimeters.

20. The process of claim 17 further comprising applying the cap to the container with less than 70 pounds of down force to seal the cap to the container while holding the associated fluid within the container under pressure.

21. The process of claim 17 further comprising including a second, shoulder region adjacent an interface of the first axial region with an end wall of the cap, the shoulder region dimensioned for engagement along an apex portion of the container opening, and generating drag forces when the cap is moved relative to the container rather than sealing the pressure of the associated fluid within the container, which is performed solely by the seal formed between the first axial region in the smallest inner diameter of the container opening.

* * * * *